(12) United States Patent
Wu et al.

(10) Patent No.: US 8,207,082 B2
(45) Date of Patent: Jun. 26, 2012

(54) METHOD FOR MAKING SILICA SHAPED BODIES

(75) Inventors: Jason Wu, Clinton, NJ (US); Theodore E. Datz, Easton, PA (US); Ralph Dehaas, Easton, PA (US); Jean W. Beeckman, Columbia, MD (US)

(73) Assignee: Exxonmobil Research and Engineering Company, Annandale, NJ (US)

( * ) Notice: Subject to any disclaimer, the term of this patent is extended or adjusted under 35 U.S.C. 154(b) by 793 days.

(21) Appl. No.: 12/087,981

(22) PCT Filed: Jan. 12, 2007

(86) PCT No.: PCT/US2007/000999
§ 371 (c)(1),
(2), (4) Date: Nov. 24, 2008

(87) PCT Pub. No.: WO2007/145676
PCT Pub. Date: Dec. 21, 2007

(65) Prior Publication Data
US 2010/0206775 A1    Aug. 19, 2010

(51) Int. Cl.
*B01J 21/08* (2006.01)
*B01J 31/06* (2006.01)

(52) U.S. Cl. .......................... 502/232; 502/150; 502/159

(58) Field of Classification Search .................. 502/150, 502/151, 159, 172, 232, 233, 263, 439
See application file for complete search history.

(56) References Cited

U.S. PATENT DOCUMENTS

| 4,435,278 | A | * | 3/1984 | Chen ......................... 208/251 H |
| 6,136,179 | A | * | 10/2000 | Sherwood et al. ............ 208/109 |
| 6,709,570 | B1 | * | 3/2004 | Van Crijnen-Beers et al. ....................... 208/111.01 |

FOREIGN PATENT DOCUMENTS

WO    WO 00/72966    * 12/2000
* cited by examiner

*Primary Examiner* — Walter D Griffin
*Assistant Examiner* — Renee E Robinson
(74) *Attorney, Agent, or Firm* — David Weisberg

(57) ABSTRACT

This invention relates to a method for making shaped bodies having a silica content of at least 85 wt %, to shaped bodies made by such method, to catalyst compositions comprising shaped bodies made by such methods and to catalytic conversion processes using catalyst compositions comprising shaped bodies made by such methods. The method of making the shaped bodies comprises the steps of a) forming shaped bodies from a mixture obtained from at least one amorphous silica powder, at least one silica sol having a pH below 7, and at least one polymeric organic extrusion aid, optionally supplemental liquid medium and optionally crystallites of a zeolite or zeolite-type material; b) drying the shaped bodies obtained in step a); and c) heating the shaped bodies to a temperature ranging from about 500° C. to about 800° C.

24 Claims, No Drawings

METHOD FOR MAKING SILICA SHAPED BODIES

FIELD OF THE INVENTION

This invention relates to a method for making shaped bodies, to shaped bodies made by such method, to catalyst compositions comprising shaped bodies made by such methods and to catalytic conversion processes using catalyst compositions comprising shaped bodies made by such methods.

BACKGROUND OF THE INVENTION

Many industrial processes use active materials that need to be supported on shaped bodies or that need to be bound in shaped bodies, so they can be handled and loaded in reactors. Examples of such catalysts include supported metals, supported metal complexes, supported organometallics, bound zeolites and bound zeolite-type materials. Shaped bodies are typically made of silica, alumina, alumino-silicates and other types of inorganic refractory oxides. Inorganic oxide catalyst shaped bodies are typically prepared by forming a mixture of one or several sources of the inorganic oxide in a suitable vehicle, said vehicle typically being water, an organic solvent or mixtures thereof. The mixture is formed into particles of various shapes, dried and calcined.

In order to be used as catalyst carriers, these bodies must have appropriate surface properties, sizes, shapes and porosities to carry the desired amounts of active materials and to enable catalyst handling, especially during reactor loading and unloading. The shaped bodies must also be strong enough to sustain catalytic conditions, and they must also have appropriate porosities and shapes to avoid high pressure drops across the reactor and allow the desired catalytic reactions to take place.

The choice of catalyst carriers will depend on various factors, such as, for example, the type of catalytic material used, the required catalyst strength and the required diffusivity across catalyst particles.

While silica shaped bodies have been known for a long time and are commercially available in various forms, silica shaped bodies having large pores are not easy to obtain on large commercial scale, for technical and economic reasons. One of the technical problems in forming particulate inorganic material, such as silica, resides in the difficulty in forming suitable plasticized mixtures that can be processed in conventional particle forming equipment, such as extruders, for example.

U.S. Pat. Nos. 6,576,120 and 6,709,570 disclose a method for preparing catalysts comprising ZSM-5 and silica which comprises: (a) preparing an extrudable mass by first mixing ZSM-5, an amorphous precipitated silica and an acid colloidal silica into a first homogeneous mixture having a pH below 7 and subsequently adding ammonia to the first homogeneous mixture such that the pH of the resulting second mixture has a value of above 8, (b) extruding the extrudable mass resulting from step (a), (c) drying the extrudate resulting from step (b); and, (d) calcining the dried extrudate resulting from step (c).

International Publication Number WO 2006/026067-A1 describes a method for the manufacture of a structured body, which process comprises (a) preparing a batch composition free of organic solvent comprising (i) at least one particulate inorganic material, (ii) at least one particulate silicone resin of average particle size 700 microns or less, and (iii) water, and (b) forming the batch composition into a structured body. While this method provides shaped bodies with excellent properties, it requires the use of silicone resins that can be expensive if used on a very large scale.

We have now found a new method for making silica shaped bodies that uses plasticized mixtures that can easily be prepared and processed in large commercial scale particle forming equipment. Furthermore, the method of the invention allows to make silica shaped bodies of varying pore sizes, to meet the needs of a wide range of uses for the shaped bodies made by such process.

SUMMARY OF THE INVENTION

The present invention relates to a method of making a shaped body having a silica content of at least 85 wt %, the method comprising the steps of a) forming a shaped body from a mixture obtained from at least one amorphous silica powder, at least one silica sol having a pH below 7, and at least one polymeric organic extrusion aid, and optionally supplemental liquid medium, preferably water; b) drying the shaped body obtained in step a); and c) heating the shaped body to a temperature ranging from about 500° C. to about 800° C. Conveniently, the silica sol contributes to an amount of from about 4 wt % to about 40 wt % of the overall amount of silica in the mixture used in step a). Optionally, the mixture that is shaped in step a) further comprises crystallites of a zeolite or zeolite-type material, preferably in an amount that does not exceed the amount of silica in the mixture.

Step c) is preferably carried out under one or several of the following conditions:
in the presence of steam;
in the presence of steam and air;
in an atmosphere containing at least 5 vol. % air;
in an atmosphere containing at least 10 vol. % steam.

Preferably, the polymeric extrusion aid is selected from polyvinyl alcohols, cellulose, cellulose ethers, such as methylcellulose and hydroxypropyl methyl cellulose polymers, colloidal silica, floridin, carbon powder, graphite, polyoxyethylene, mixed walnut shell and mixtures of two or more thereof. Also preferably, the polymeric extrusion aid is used in an amount of from about 0.5 to about 10 parts by weight per 100 parts by weight, of the overall silica present in the mixture used in step a).

The present invention also relates to a catalyst, comprising a shaped body prepared by the method of the invention and to processes for converting hydrocarbon feedstocks using such catalysts.

DETAILED DESCRIPTION OF THE INVENTION

The invention relates to a method for making silica shaped bodies having a silica content of at least 85 wt %, that uses at least one amorphous silica powder, at least one silica sol having a pH below 7, and at least one extrusion aid, and optionally supplemental liquid medium. The method of the invention uses starting materials that are readily available on a large scale. It provides a convenient method to form shaped particles from a plasticized formulation mixture. The method of the invention also uses a step of heating the formed particles at high temperature, preferably in the presence of steam, most preferably in the presence of a mixture of steam and air. This allows the preparation of silica shaped bodies having large pores and good crush strength.

For the purposes of the present invention, silica sols are stable colloidal dispersions of amorphous silica particles in an aqueous or organic liquid medium, preferably water. Non-limiting examples of commercially available silica sols include those sold under the tradenames Nyacol (available from Nyacol Nano Technologies, Inc. or PQ Corp.), Nalco (available from Nalco Chemical Company), Ultra-Sol (available from RESI Inc), Ludox (available from W.R. Grace Davison), NexSil (available from NNTI). Many silica sols are prepared from sodium silicate that inevitably contain sodium. It is however preferable to avoid the presence of alkali metals in the shaped bodies of the invention, since the presence of sodium ions can cause sintering of the catalyst at high temperature and/or affect catalytic performance. Therefore, if silica sols containing sodium are used, a step of ion exchange will be required after formation of the particles in order to remove sodium. To avoid carrying out ion exchange steps, it is preferable to use silica sols that contain very little or, ideally, no detectable traces of sodium and have a pH value of less than 7. Most preferably, the silica sol used in the process is slightly acidic. Non limiting examples of preferred silica sols that contain no detectable traces of sodium include Nyacol 2034DI, Nalco 1034A, Ultra-Sol 7H or NexSil 20A.

Any amorphous silica powder can be used to form the mixture used in step a), provided it forms with the other ingredients used in step a), a mixture that can be extruded. We have found Ultrasil VN3SP (commercially available from Degussa) convenient, as it is very cheap and easily available in large commercial scale quantities. Another non-limiting example of suitable solid silica source is HiSil 233 EP (available from PPG Industries).

The mixture shaped in step a) may optionally also comprise crystallites of at least one zeolite or zeolite-like material. Non-limiting examples of zeolites or zeolite-like materials that can be used include microporous and mesoporous crystalline silicates, aluminosilicates, metallosilicates, aluminophosphate, silicoaluminophosphates, metalloaluminophosphates and intergrown froms thereof and mixtures thereof, such as, for example, ZSM-5, ZSM-11, ZSM-12, ZSM-22, ZSM-23, ZSM-48, ZSM-57, MCM-22, MCM-41, M-41S, MCM-48, chabazite, faujasite, zeolite Y, zeolite beta, ferrierite, SAPO-5, SAPO-11, SAPO-18, SAPO-34, SAPO-56, ITQ-1, ITQ-2, ITQ-3, ITQ-13, ITQ-21, ITQ-22, ITQ-24, metal-containing forms thereof, intergrown crystalline forms thereof and mixtures thereof. Since the process of the invention uses a step of heat treatment in the presence of steam, the zeolite or zeolite-like material should be capable of maintaining, or enhancing, its catalytic properties during the steam treatment step. The process of the invention is for example well suited for zeolite materials containing no or low levels of alumina that could leach out of the crystal structure upon treatment with steam. Non-limiting examples of such materials include aluminosilicates or germanoaluminosilicates having a silica to alumina molar ratio of at least 10.

The mixture shaped in step a) also contains at least one polymeric organic extrusion aid. Non limiting examples of suitable polymeric organic extrusion aids include polymeric materials selected from polyvinyl alcohols, cellulose, cellulose ethers, such as methylcellulose and hydroxypropyl methyl cellulose polymers, colloidal silica, floridin, carbon powder, graphite, polyoxyethylene, mixed walnut shell or mixtures thereof. Conveniently, the organic material is a polyvinyl alcohol.

The mixture shaped in step a) contains a liquid medium, such as an organic or aqueous medium. Preferably, the liquid medium is water.

The amounts of ingredients can vary within wide limits, provided that the mixture used in step a) has the appropriate fluidity and cohesion to be converted into shaped particles. The person skilled in the art will appreciate that the ratios of the mixture components will be different, depending on the physical and chemical properties of the ingredients used, as well as the shaping technique used. Preferably, and not taking into consideration the weight of zeolite or zeolite-like material that may optionally be present in the mixture, the silica sol is used in an amount such that the silica sol contributes from about 5 wt. % to about 40 wt. %, preferably from about 10 wt. % to about 35 wt. %, and more preferably from about 12 wt. % to about 30 wt. % of the total amount of silica used in the mixture that is shaped in step a). The optional zeolite or zeolite-type material is typically present in an amount that does not exceed the amount of silica used in the mixture to be shaped in step a). As to the amount of polymeric extrusion aid, it should be kept as low as possible but should be sufficient to facilitate extrusion. For example, the polymeric extrusion aid can be used in amounts of from about 0.5 to about 10 parts by weight, preferably of from about 1 to about 7 parts by weight, more preferably of from about 2 to about 5 parts by weight, per 100 parts by weight of silica in the mixture that is used in step a), or per 100 parts of the combined weight of silica and crystallites of zeolites or zeolite-type material, if such crystallites are present in the mixture.

The mixture which is used in step a) is typically prepared by combining the ingredients together in a mixer, such as, for example, an Eirich mixer or a wheel mixer. The mixture components may be added in different orders to the mixer. As a non limiting example of how the mixture might be prepared, the solid components can be placed first in the mixer, followed by the liquid components. The components are typically mixed at room temperature while the silica sources, polymeric material, water and optionally the crystallites of zeolite or zeolite-type material are combined to form the mixture. Mulling can also be applied if necessary, to break down solid particles to a suitable size for mixture homogeneity, cohesion and viscosity. The amount of liquid medium, preferably water, can also be adjusted at any stage of the mixture preparation, to obtain a mixture with viscosity and cohesion suitable for the chosen particle shaping process (optional supplemental liquid medium).

Particle shaping can be performed by any method known in the art, such as extrusion, compression molding, spherudizing or other bead shaping techniques. Preferably, particle shaping is performed by extrusion. Extrusion apparatuses suitable for making rod-, cylindrical or prism-shaped particles typically consist of a hopper for introduction of the mixture being shaped, a de-airing chamber, and either a screw-type or plunger-type transport barrel in which pressure is generated for passage of the mixture through a die of the desired geometry. The mixture is extruded onto a carrier belt and passed through driers to relax the strain remaining after extrusion. The driers remove most of the water from the extruded product, but typically do not remove any organic material that may be present in the extrudates; drying is usually performed at a temperature of less than 200° C., such as between 100° C. and 150° C., typically of from 120° C. to 140° C. for a period of at least 10 minutes, such as from 10 minutes to several hours. The strands obtained after drying are broken up in smaller pieces to form cylinders or prisms. The cylinders or prisms are then sieved and broken up further to the required size range. If shaped by extrusion, the mixture used in step a) preferably has a solid contents of 35 to 55 wt %, preferably of 40 to 50 wt. %, most desirably of 40 to 45 wt. % and conveniently of about 43 wt. %.

Spherical shapes can be obtained using a spherudizer, such as a McNally-Wellman pelletizing disc or other similar equipment. The spherudizer consists of a rotating disk operated on an angle. As it rotates, smaller spheres used as seed material are place in the bottom part of the disk and a spray of cohesive slurry is sprayed onto them. As the moisture in the slurry evaporates, the solids form a layer on the exterior of the spheres, increasing their diameter. As the spheres increase in size, they segregate into sections where the material of the desired size can be removed. Sphere or pellets can also be formed with pilling machines.

After shaping and drying at a temperature of less than 200° C., the shaped particles are usually referred to as "green" particles or green catalyst. The green particles still contain any polymeric extrusion aid that may have been used and typically have crush strengths that are too low for use in catalytic processes. Heat treatments are thus necessary to harden the particles, and remove any organic material that may be present in the catalyst and that could interfere during use of the shaped bodies. In the process of the invention, such heat treatment is performed by steam calcination, i.e. by heating at temperatures ranging from about 500° C. to about 800° C., preferably, from about 550° C. to about 750° C., in the presence of steam. Preferably, calcination is performed in the presence of a mixture of steam and air. In order to obtain shaped bodies within the desired pore size range, it is preferred that the calcination atmosphere contains at least 10 vol. % steam, preferably at least 15 vol. % steam, and more preferably, at least 20 vol. % steam. Also, if organic materials are present in the green shaped body, it is preferred that calcination take place in the presence of at least 2 vol. % air, preferably at least 5 vol. % air. In one particular embodiment, the calcination atmosphere contains 10-20 vol. % steam and 90-80 vol. % air; in another particular embodiment, the calcination atmosphere contains 2-10 vol. % air and 98-90 vol. % steam. By varying the calcination temperature and composition of the calcination atmosphere, shaped bodies with different pore sizes can be obtained. We have found that the higher the temperature used during steaming, the larger the pore size. The pore size of the shaped body can thus be varied very simply by changing the calcination temperature. This optimizes the diffusion properties of the shaped body according to its intended use.

Calcination conditions can be applied for variable amounts of time, depending on the calcination temperature and the composition of the calcination atmosphere. The duration should be sufficient to allow removal of any organic material present in the particles, and should also be sufficient to harden the particles to the desired level. However, calcination should not be carried out too long to avoid shaped body degradation. Typically, the desired results are achieved by applying the calcination conditions for a duration of from about 10 to about 120 minutes, preferably from about 15 to about 60 minutes.

The method of the invention forms silica shaped bodies that are particularly suitable as catalyst components, in particular, as carriers for supported catalysts. The shaped bodies made by the method of the invention consist essentially of silica, that is, the silica content of the shaped body is of at least 85 wt %, preferably at least 90 wt %, more preferably at least 95 wt %, with respect to the total weight of the shaped body, excluding the weight of zeolite or zeolite-like crystallites, if present. The method of the invention is particularly suitable to manufacture large pore shaped bodies, that is, shaped bodies having a median pore size of 180 Angstroms or more, conveniently in the range of from about 200 Angstroms to about 500 Angstroms, and preferably of 220 Angstroms or more, conveniently in the range of from about 220 to about 450 Angstroms. Preferably, the shaped bodies have a median pore size of 600 Angstroms or less, preferably of 500 Angstroms or less, conveniently of 450 Angstroms or less.

For the purposes of the present invention, median pore sizes are determined by mercury intrusion porosimetry, according to the ASTM D4284-03 method. The pore size distribution may be monomodal, bimodal or plurimodal. However, monomodal pore size distributions are preferred.

The silica shaped bodies made by the method of the invention are non-crystalline, amorphous solids, that is, excluding the crystallinity provided by zeolites or zeolite-like materials, if present. Their solid structure possesses substantially no short distance or long distance order, such as that found in zeolite or zeolite-type materials, or even mesoporous materials such as M-41S-type materials. If crystallites of zeolites or zeolite-like materials are present in the mixture that is shaped, the silica wraps around and binds the zeolite or zeolite-like material crystals together, as well as acting as a shaped body. In such case, the silica that binds the crystalline material together is still amorphous.

The silica shaped bodies may be made into various shapes and sizes, depending on their intended use. For use as catalyst support, non-limiting examples of suitable shapes include spheres, beads, cylinders, prisms with various prism base shapes, such as, for example, trilobe or quadrulobe prism base shapes, tubes or honeycombs. Also, if intended for use as catalyst support, the shaped body conveniently has a size ranging from about 1 mm to about 20 mm. In the case of spheres, cylinders or prisms of various shapes, the sphere, cylinder base or prism base shape conveniently has a size ranging from about 1 mm to about 3 mm, preferably from 1.1 mm to 2.5 mm.

Preferably, the shaped bodies made by the method of the invention have a pore volume between 0.5 and 2.0 cm$^3$/g, more preferably between 0.8 and 1.2 cm$^3$/g, and even more preferably between 0.8 and 1.0 cm$^3$/g, as determined by mercury intrusion porosimetry, according to the ASTM D4284-03 method.

In another preferred embodiment, and in particular, if no zeolite or zeolite-like materials are present, the method of the invention produces shaped bodies having a surface area, determined by BET, ranging from 50 to 150 m$^2$/g, preferably ranging from 60 to 140 m$^2$/g.

In another aspect of the invention, the silica shaped body made by the method of the invention contains a very low level of alkaline metal ions, such as sodium or potassium. Alkaline ions are often present in small amounts in silica shaped bodies, due to their presence in the starting materials used to make the shaped bodies. During calcination or catalytic use, traces of sodium or potassium can cause sintering and/or affect catalytic performance. To avoid these problems, the presence of sodium and potassium in the silica shaped bodies must be kept as low as possible. The method of the invention uses at least one silica sol that has a pH below 7, that preferably contains no detectable levels of sodium or potassium. This enables the formation of silica shaped bodies typically having alkaline ion levels of less than 1%, preferably less than 0.7%, more preferably 0.6% or less, and even more preferably 0.5% or less of the weight of the shaped body. One advantage of using such silica source is that no ion exchange step is required to remove alkaline ions after extrusion and/or calcination.

After the heat treatment, the shaped bodies made by the process of the invention typically have a crush strength of at least 625 g/mm (35 lb/inch), preferably between 625 g/mm (35 lb/in) and 2144 g/mm (120 lb/inch), when determined by the strain beam method with a 3.175 mm (⅛ inch) Anvil configuration, as described in the experimental section.

The shaped bodies made by the method of the invention are useful components of catalysts intended for use in catalytic processes, especially those that require rapid diffusion of reagents and products throughout the catalyst. Non-limiting examples of such catalytic processes include reactions using hydrogen, such as hydrogenation, desulfurization, hydrofining, hydrofinishing or hydrocracking, polymerization reactions, such as supported Ziegler-Natta or metallocene polymerization reactions, catalytic cracking, catalytic dewaxing, olefin oligomerization, olefin isomerization, alkylation, for example aromatic alkylation, reformate alkylation, phenol alkylation, the conversion of light olefins to gasoline, distillate and tube range hydrocarbons, the conversion of oxygenates to hydrocarbons.

Accordingly, the invention also relates to a catalyst comprising the shaped bodies made by the method of the invention and an active material. In one embodiment, the catalyst comprises a zeolite or zeolite-type material bound with the silica shaped body of the invention. In another embodiment, the catalyst comprises a shaped body of the invention and one or several metal-containing active materials. In a preferred specific embodiment, the metal is selected from Group IVb, VIa and Group VIII of the Periodic Table of Elements. In a specific embodiment, the catalyst comprises a silica shaped body of the invention on which cobalt oxide and molybdenum oxide have been deposited. In yet another embodiment of the invention, the catalyst comprises a zeolite or zeolite-type material bound with the silica shaped body of the invention, and one or several metal-containing active metals.

To deposit active materials on the shaped bodies made by the process of the invention, the shaped bodies can be impregnated by a solution of the active material or a solution of a precursor of the active material, by methods well known in the art, such as, for example, incipient wetness. In the incipient wetness method, a solution containing the active material or a precursor thereof is mixed with the shaped body up to the point of incipient wetness. The impregnated shaped body is then heated and dried at temperatures typically in the range of from about 50° C. to about 200° C. Drying, can take place under vacuum, or in air, or inert gas such as nitrogen.

In a preferred embodiment, catalysts comprising a shaped body made by the process of the invention are used to selectively hydrodesulfurize naphtha streams, that is, middle boiling range hydrocarbon fractions that are major components of gasoline, and having boiling ranges from about 10° C. (i.e., starting from $C_5$ hydrocarbons) to about 232° C. at atmospheric pressure, and preferably boiling ranges of from about 21° C. to about 221° C. at atmospheric pressure. The preferred naphtha streams have olefin contents of at least about 5 wt % to about 60 wt %, preferably of at least 5 wt % to about 40 wt %, based on the weight of the naphtha stream. Preferably such stream have sulfur contents from about 300 ppm to about 7000 ppm, based on the weight of the naphtha stream, and/or preferably nitrogen contents of from 5 ppm to about 500 ppm, based on the weight of the naphtha stream. Olefins include open chain olefins, cyclic olefins, dienes and cyclic unsaturated hydrocarbons.

The preferred catalyst for use to hydrodesulfurize such naphtha streams comprises a silica shaped body made by the process of the invention and from about 2 wt % to about 8 wt %, preferably from about 3 wt % to about 6 wt % cobalt oxide, based on catalyst, and from about 8 wt % to about 30 wt %, preferably from about 10 wt % to about 25 wt % molybdenum oxide, based on catalyst. The most preferred catalyst also contains an organic ligand used during the metal impregnation step, before the catalyst is used in the hydrodesulfurization process. Examples of such organic ligands include at least one of carboxylic acids, polyols, amino acids, amines, amino alcohols, ketones, esters and the like, for example, phenanthroline, quinolinol, salicylic acid, acetic acid, ethylenediaminetetraacetic acid (EDTA), cyclohexanediaminetetraacetic acid (CYDTA), alanine, arginine, triethanolamine (TEA), glycerol, histidine, acetylacetonate, guanidine, and nitrilotriacetic acid (NTA), citric acid and urea.

When the shaped bodies of the invention are used in catalysts for naphtha hydrodesulfurization, the impregnated catalyst is preferably used in a dried, but not calcined, form. Before use, the dried catalyst precursor is treated with hydrogen sulfide at preferred concentrations of from about 0.1 vol. % to about 10 vol. % based on total volume of gases present, for a period of time and at a temperature sufficient to convert metal oxide, metal salt or metal complex to the corresponding sulfide in order to form the HDS catalyst. The hydrogen sulfide may be generated by a sulfiding agent incorporated in or on the catalyst precursor. In an embodiment, the sulfiding agent is combined with a diluent. For example, dimethyl disulfide can be combined with a naphtha diluent. Lesser amounts of hydrogen sulfide may be used, but this may extend the time required for activation. An inert carrier may be present and activation may take place in either the liquid or gas phase. Examples of inert shaped bodies include nitrogen and light hydrocarbons such as methane. When present, the inert gases are included as part of the total gas volume. Temperatures are preferably in the range from about 150° C. to about 700° C., more preferably about 160° C. to about 343° C. The temperature may be held constant or may be ramped up by starting at a lower temperature and increasing the temperature during activation. Total pressure is preferably in the range up to about 5000 psig (34576 kPa), more preferably about 0 psig to about 5000 psig (101 to 34576 kPa), most preferably about 50 psig to about 2500 psig (446 to 17338 kPa). If a liquid carrier is present, the liquid hourly space velocity (LHSV) is preferably from about 0.1 $hr^{-1}$ to about 12 $hr^{-1}$, more preferably about 0.1 $hr^{-1}$ to about 5 $hr^{-1}$. The LHSV pertains to continuous mode. However, activation may also be done in batch mode. Total gas rates may be for example from about 89 $m^3/m^3$ to about 890 $m^3/m^3$ (500 to 5000 scf/B).

Catalyst sulfiding may occur either in situ or ex situ. Sulfiding may occur by contacting the catalyst with a sulfiding agent, and can take place with either a liquid or gas phase sulfiding agent. Alternatively, the catalyst may be presulfurized such that $H_2S$ may be generated during sulfiding. In a liquid phase sulfiding agent, the catalyst to be sulfided is contacted with a carrier liquid containing sulfiding agent. The sulfiding agent may be added to the carrier liquid or the carrier liquid itself may be the sulfiding agent. The carrier liquid is preferably a virgin hydrocarbon stream and may be the feedstock to be contacted with the hydroprocessing catalyst but may be any hydrocarbon stream such as a distillate derived from mineral (petroleum) or synthetic sources. If a sulfiding agent is added to the carrier liquid, the sulfiding agent itself may be a gas or liquid capable of generating hydrogen sulfide under activation conditions. Examples include hydrogen sulfide, carbonyl sulfide, carbon disulfide, sulfides such as dimethyl sulfide, disulfides such as dimethyl disulfide, and polysulfides such as di-t-nonylpolysulfide. The sulfides present in certain feeds, e.g., petroleum feeds, may act as sulfiding agent and include a wide variety of sulfur-containing species capable of generating hydrogen sulfide, including aliphatic, aromatic and heterocyclic compounds.

Following sulfiding, the catalyst may be contacted with naphtha under hydrodesulfurizing conditions. Hydrodesulfurizing conditions include temperatures of from about 150° C. to about 400° C., and/or pressures of from about 445 kPa to about 13890 kPa (50 to 2000 psig), and/or liquid hourly space velocities of from about 0.1 hr$^{-1}$ to about 12 hr$^{-1}$ and/or treat gas rates of from about 89 m$^3$/m$^3$ to about 890 m$^3$/m$^3$ (500 to 5000 scf/B). After hydrodesulfurization, the desulfurized naphtha can be conducted away for storage or further processing, such as stripping to remove hydrogen sulfide. The desulfurized naphtha is useful for blending with other naphtha boiling-range hydrocarbons to make motor gasoline.

Selected embodiments of the invention, including preferred embodiments, are illustrated in the following examples.

Materials and Methods

Unless indicated otherwise, the following materials and methods were used.

Surface area (SA): was determined by nitrogen adsorption, using a Micromeritics Tristar V6.05 instrument and using the BET equation;

Pore volume (PV) and median pore diameter (MPD): were determined by mercury intrusion porosimetry, according to the ASTM D 4284-03 method, assuming a contact angle of 130° for mercury on silica, using a Micrometitics AutoPore IV 9500 instrument. The reported median pore diameters were calculated from the mercury intrusion volume measurements.

The alumina content, sodium content and potassium content were determined by inductively coupled plasma (ICP) emission spectroscopy, using an IRIS instrument manufactured by Thermo Electron Corporation.

Crush strength (Crush) was determined by averaging the crush strength of 100 or more particles, determined with a Vankel VK200 Tablet Hardness Tester, using a strain beam method with a 3.175 mm (⅛ inch) Anvil configuration. The principle of the method is that a force is applied by the beam to the particle; the crush strength is the amount of force applied by the beam that will cause particle fracture. The instrument reports crush strength as lb/inches. A crush strength of 1 lb/inch can also be expressed as a crush strength of 17.87 g/mm.

Ultrasil VN3SP is a precipitated silica available from Degussa having a silica content of 98 wt %, a sodium content of about 0.4 wt %, an alumina content of about 0.1 wt % and a BET surface area of 155-195 m$^2$/g.

Nyacol 2034DI (available from Nyacol Nano Technologies) is an aqueous colloidal silica sol having a silica content of 34 wt %, a pH of 3.0 and a viscosity of 7 cPs.

The polyvinyl alcohol (PVA) used in the experiments is a polyvinyl alcohol sold by Celanese under the tradename PVA, having an OH number of 78-82 mole %.

The Lancaster Muller is a mixing/mulling apparatus that consists of a rotating pan of approximately 40 liters (10 gallons) in size and is topped with a hydraulically operated stainless steel four inch wheel, scraping blade, and mixer. Pressure can be applied to the mulling wheel by use of regulated air pressure. The purpose of the Lancaster Muller is to mix and push ingredients together. Additional ingredients can be added through a small door on top of the apparatus, or by stopping the rotation, raising the top half of unit and adding directly to the pan.

The Eirich Mixer is a mixing apparatus that consists of a variable speed rotating pan of approximately 28 liters (7 gallons) in size and is topped with a variable speed stainless steel four prong mixer, and scraping blade. The purpose of the Eirich Muller is to mix and whip ingredients together. Additional ingredients can be added through a small door on top of the apparatus, or by stopping the rotation, raising the top half of unit and adding directly to the pan.

The Two Inch Bonnet Extruder is an extrusion apparatus that uses an electrical motor to drive a two inch diameter auger rotation. At one end of the auger is a feed hopper for supplying the catalyst mix. At the outlet of the auger tube, die plates for shaping the catalyst would be attached by means of bolting the plate to the face of the auger outlet tube. Die plate pressure can be monitored via a pressure transducer located at the outlet of the extruder. The shapes of the extrudate can be dictated by the individual die plate. Typically, either steel or plastic dies are used.

Example 1

In this example, the properties of various commercially available supports were determined. Table 1 lists the properties for each shaped body.

TABLE 1

| | Vendor | Description | SA m$^2$/g | PV cc/g | MPD Å | Al$_2$O$_3$, wt % | Na, wt % | K, wt % | Crush g/mm (lb/in) |
|---|---|---|---|---|---|---|---|---|---|
| I | Criterion | Silica 1.6 mm (1/16") cylinder | 234 | 1.12 | 162 | 0.08 | 0.09 | n.a.[1] | n.a.[1] |
| II | Grace | Silica 1.6 mm (1/16") trilobe, Davicat SI 1600 | 265[3] | 1.3[3] | 200[3] | n.a.[1] | 0.04[3] | n.a.[1] | 857.8 (48) |
| III | Norton (Norpro) | Silica 1.6 mm (1/16") cylinder, SS61138 | 251 | 0.93 | 111 | <0.15 | 0.10 | n.a.[1] | n.a.[1] |
| IV | PQ | Silica beads, screened to 1.7-2.0 mm size | 274 | 1.207 | 105 | 0.06 | 0.05 | 0.01 | 1054.3 (59) |
| V | Fuji Silysia | Cariact Q-50 silica beads, 1.7-2 mm | 77 | 1.05 | 384 | <0.05 | 0.03 | <0.01 | 1286.6 (72) |
| VI | Fuji Silysia | Cariact Q-50 silica beads 1.4-1.7 mm | 76 | 1.03 | 378 | <0.05 | 0.03 | <0.01 | 1286.6 (72) |
| VII | Norton | Silica beads, XS 16080 | 120 | 0.74 | 130[4] 600[4] | <0.2 | <0.2 | n.a.[1] | 1107.9 (62) |

[1] n.a. means not available
[2] below detection limit
[3] based on vendor specification
[4] bimodal

Example 2

In this example, shaped body IV of example 1 was contacted with steam at various temperatures.

Calcination and steaming experiments were carried out in a horizontal quartz tube preheated in a horizontal oven to the specified temperatures and at one atmospheric pressure. The atmosphere inside the quartz tube was composed of 100% steam. In a typical experiment, 11 grams of "green" extrudate were loaded into a quartz boat, and the boat was inserted to the center of the quartz tube at the specified temperature. After the specified duration, the quartz boat was removed from the quartz tube and cooled down to room temperature.

The properties of the shaped bodies obtained after the steam treatments are given in Table 2.

TABLE 2

| | Temperature °C. | Duration | % steam | SA, m²/g | PV cc/g | MPD Å | Crush g/mm (lb/in) |
|---|---|---|---|---|---|---|---|
| a | 650 | 1 hr | 100 | 139 | 1.188 | 107 | 1158.0 (64.8) |
| b | 705 | 1 hr | 100 | 138 | 1.163 | 110 | 1158.0 (64.8) |
| c | 760 | 1 hr | 100 | 145 | 1.145 | 115 | 1229.4 (68.8) |
| d | 815 | 1 hr | 100 | 146 | 1.061 | 121 | 1329.5 (74.4) |

This example shows that steaming shaped body IV at temperatures of from 650° C. to 815° C. results in shaped bodies having a lower surface area, a lower pore volume and larger pore sizes.

Example 3 a. Lancaster Muller Procedure 1022 g of Ultrasil VN3SP silica were added to the Lancaster Muller pan and were mulled for 3 minutes, using 1734 kPa (250 psi) on the Lancaster Muller wheel, to obtain a fine powder. Then, 706 g of Nyacol 2034DI were added to the Lancaster Muller, and mulling was applied for another 3 minutes. A solution of 48 g PVA dissolved in 500 g of deionized water was added to the Lancaster Muller, followed by 562 g additional deionized water.

The composition of the mixture is summarized in Table 3.

TABLE 3

| Ingredient | Solids (%) | Composition (%) | Solid weight (g) | "As is" weight (g) |
|---|---|---|---|---|
| Ultrasil VN3SP | 93.9 | 80 | 960 | 1022 |
| Nyacol 2034DI | 34 | 20 | 240 | 706 |
| Water | | | | 1062 |
| Total (without PVA) | 43 | 100 | 1200 | 2839 |
| PVA | | 4 | | 48 |

Mulling was applied to the so far dry mixture, and after 25 minutes, the mixture started to clump and appear wet. After 30 minutes of mulling, the mixture appeared to be of a suitable consistency to shape particles: when squeezed between hands, is stayed clumped together as a solid. The mixture was then placed in the 5 cm (two inch) Bonnet Extruder, using a 1.3 mm (1/20 inch) quadrulobe steel die plate. The extrudates were dried at a temperature of 120° C. (250° F.) and for a period of about 1 hour.

b. Eirich Mixer Muller 937 g of Ultrasil VN3SP silica were added to the Eirich Mixer pan and were mixed for 3 minutes on low mixing setting, to obtain a fine powder. Then, 647 g of Nyacol 2034DI were added to the Eirich Mixer, and mixing was applied for another 3 minutes on low setting. A solution of 44 g PVA dissolved in 400 g of deionized water was added to the Eirich Mixer, followed by 574 g additional deionized water.

The composition of the mixture is summarized in Table 4.

TABLE 4

| Ingredient | Solids (%) | Composition (%) | Solid weight (g) | "As-is" weight (g) |
|---|---|---|---|---|
| Ultrasil VN3SP | 93.9 | 80 | 880 | 937 |
| Nyacol 2034DI | 34 | 20 | 220 | 647 |
| Water | | | | 974 |
| Total (without PVA) | 43 | 100 | 1100 | 2602 |
| PVA | | 4 | | 44 |

Mixing was applied on high setting, to the so far dry mixture, and after 25 minutes, the mixture started to clump and appear wet. After 30 minutes of mixing on high setting, the mixture appeared to be of a suitable consistency to shape particles: when squeezed between hands, is stayed clumped together as a solid. The mixture was then placed in the 5 cm (two inch) Bonnet Extruder, using a 1.3 mm (1/20 inch) quadrulobe steel die plate. The extrudate was dried at a temperature of 120° C. (250° F.) and for a period of about 1 hour.

The extrudates obtained by either of the above-mentioned method were then submitted to calcination in the presence of air, steam or mixtures of air and steam by the procedure of example 2.

The properties of the shaped body obtained after these treatments are listed in Table 5.

TABLE 5

| | Temperature °C. | Duration | % steam[1] | SA, m²/g | PV cc/g | MPD Å | Crush g/mm (lb/in) |
|---|---|---|---|---|---|---|---|
| A | 760 | 30 min | 0 | 126 | 0.90 | 276 | 696.9 (39) |
| B | 760 | 1 hr | 0 | 124 | 0.90 | 274 | 857.8 (48) |
| C | 815 | 15 min | 0 | 129 | 0.88 | 276 | 929.2 (52) |
| D | 815 | 30 min | 0 | 130 | 0.89 | 277 | 804.1 (45) |
| E | 705 | 15 min | 20 | 128 | 0.90 | 279 | 875.6 (49) |
| F | 705 | 30 min | 20 | 122 | 0.89 | 284 | 911.4 (51) |
| G | 705 | 1 hr | 20 | 123 | 0.88 | 290 | 804.1 (45) |
| H | 760 | 15 min | 20 | 140 | 0.88 | 301 | 1197.3 (67) |
| I | 760 | 30 min | 20 | 106 | 0.87 | 316 | 1340.2 (75) |
| J | 815 | 15 min | 20 | 76 | 0.84 | 372 | 1894.2 (106) |
| K | 650 | 45 min | 95 | 122 | 0.90 | 294 | 982.8 (55) |
| L | 677 | 45 min | 95 | 109 | 0.89 | 317 | 1376.0 (77) |
| M | 677 | 1 hr | 95 | 89 | 0.88 | 339 | 1286.6 (72) |
| N | 705 | 45 min | 95 | 75 | 0.88 | 404 | 1590.4 (89) |
| O | 650 | 45 min | 100 | 116 | 0.91 | 308 | 1036.5 (58) |
| P | 705 | 45 min | 100 | 68 | 0.88 | 422 | 1590.4 (89) |
| Q | 760 | 1 hr | 100 | 26 | 0.88 | 1147 | 2198.0 (123) |
| R | 815 | 45 min | 100 | 13 | 0.76 | 1769 | 2108.7 (118) |

[1]The balance of the calcination atmosphere composition is air.

The results in Table 5 show that shaped bodies with different pore sizes and crush strengths can be obtained by varying the temperature and atmosphere composition during thermal treatment of the green catalyst.

Example 4

Formulations Without PVA

The procedure of example 3 was repeated, except no polyvinyl alcohol was added to the mixture to be extruded, keeping all other ratios of ingredients in the mixture identical. Without PVA, the mixtures were more difficult to extrude than those of example 3.

After drying, the green extrudates were submitted to high temperature in the presence of air or 100% steam. The properties of the shaped bodies obtained after these treatments are given in Table 6.

TABLE 6

|   | Temperature °C. | Duration | % steam[1] | SA, m²/g | PV cc/g | MPD Å | Crush g/mm (lb/in) |
|---|---|---|---|---|---|---|---|
| S | 538 | 3 hr | 0 | 176 | 0.91 | 212 | 589.7 (33) |
| T | 593 | 1 hr | 100 | 161 | 0.80 | 194 | 786.3 (44) |
| U | 650 | 1 hr | 100 | 151 | 0.78 | 196 | 893.5 (50) |
| W | 705 | 1 hr | 100 | 132 | 0.76 | 202 | 1268.8 (71) |
| X | 760 | 1 hr | 100 | 108 | 0.73 | 224 | 1804.9 (101) |
| Y | 815 | 1 hr | 100 | 68 | 0.69 | 298 | 2787.7 (156) |

[1]The balance of the calcination atmosphere composition is air.

Example 5

The properties of the silica shaped bodies were evaluated, by testing the catalytic performance of catalysts containing the silica shaped body and from 4.5 to 5.5 wt. % cobalt oxide and from 19 to 21 wt. % molybdenum oxide, based on the weight of catalyst, in a naphtha feedstream hydrogenation process.

In a representative procedure, an impregnation solution was prepared by dissolving ammonium heptamolybdate tetrahydrate and cobalt carbonate hydrate with citric acid (CA) as ligand. The cobalt to molybdenum atomic ratio was 0.48. The CoMo-CA solution was impregnated to silica support S, using the incipient wetness impregnation technique in a single step in an amount so that the dried solid would contain 5.2 wt. % CoO and 20.9 wt. % $MoO_3$, based on the weight of the catalyst. The impregnated solid was dried under vacuum at 60° C.

The silica supported CoMo catalyst was sulfided using 3% $H_2S$ in $H_2$ and virgin naphtha under sulfiding conditions. Feed for the catalyst evaluation was an FCC naphtha feed with an initial boiling point of 10° C. and a final boiling point of 177° C. containing 1408 ppm sulfur and 46.3 wt. % olefins, based on the weight of the feed. The catalysts was evaluated in an MCFB-48 unit (Multi Channel Fixed Bed-48 Reactor) at 274° C. (525° F.) at 220 psig using $H_2$. Feed flow rate was adjusted to obtain a range of 2-methylthiophene desulfurization from 65 wt. % to 95 wt. %, based on the weight of the feed. Product streams were analyzed using on-line GCs and SCDs. $C_5$ Olefin content in the product was compared with $C_5$ olefin content in the feed on a weight basis to calculate the percentage of olefin saturation (% OSAT). Results of the percentage of hydrodesulfurization (% HDS) and % OSAT were stable after about 30 hours of catalyst on stream, and were used to evaluate the olefin saturation (% OSAT) at various HDS conversions (% HDS). At 90% HDS conversion, there was about 8.7 wt. % olefin saturation for the $CoMo/SiO_2$ catalysts prepared using support S.

Similar procedures were used to prepare and test Co/Mo catalysts having from 4.5 to 5.5 wt. % cobalt oxide and from 19 to 21 wt. % molybdenum oxide, based on the weight of catalyst, and shaped bodies I, IV, K, N, Q, R, S, U, X and Y. The properties of the shaped bodies used and the catalytic performance obtained with the Co/Mo catalysts obtained from the silica shaped bodies are summarized in Table 7.

TABLE 7

| Shaped body | Description | SA m²/g | PV cc/g | MPD Å | Crush g/mm (lb/in) | % C5⁼ saturation at 90% HDS |
|---|---|---|---|---|---|---|
| I | Criterion—Silica 1/16" cylinder | 234 | 1.12 | 162 | n.a.[1] | 9.5 |
| IV | PQ—silica beads, screened to 1.7-2.0 mm size | 274 | 1.21 | 105 | 1054.3 (59) | 97 |
| K | 80/20 VN3P/Nyacol 2034DI/4% PVA—95% steam 650° C. | 122 | 0.90 | 294 | 982.8 (55) | 6.7 |
| N | 80/20 VN3P/Nyacol 2034DI/4% PVA—95% steam 705° C. | 75 | 0.88 | 404 | 1590.4 (89) | 7.1 |
| Q | 80/20 VN3P/Nyacol 2034DI/4% PVA—100% steam 760° C. | 26 | 0.88 | 1147 | 2198.0 (123) | 6.3 |
| R | 80/20 VN3P/Nyacol 2034DI/4% PVA—100% steam 815° C. | 13 | 0.76 | 1769 | 2108.7 (118) | 6.3 |
| S | 80/20 VN3P/Nyacol 2034DI—0% steam | 176 | 0.91 | 212 | 589.7 (33) | 8.7 |
| U | 80/20 VN3P/Nyacol 2034DI—100% steam 650° C. | 151 | 0.86 | 196 | 893.5 (50) | 8.3 |
| X | 80/20 VN3P/Nyacol 2034DI—100% steam 760° C. | 108 | 0.84 | 224 | 1804.9 (101) | 8 |

TABLE 7-continued

| Shaped body | Description | SA m²/g | PV cc/g | MPD Å | Crush g/mm (lb/in) | % C5⁼ saturation at 90% HDS |
|---|---|---|---|---|---|---|
| Y | 80/20 VN3P/Nyacol 2034DI—100% steam 815 | 68 | 0.78 | 298 | 2787.7 (156) | 7.2 |

[1]not available

The results in Table 7 show that the catalysts prepared with the shaped bodies with the largest pore sizes gave the least undesired $C_5^=$ saturation at 90% HDS.

The invention claimed is:

1. A method of making a shaped body having a silica content of at least 85 wt %, the method comprising the steps of
   a) forming a shaped body from a mixture obtained from at least one amorphous silica powder, at least one silica sol having a pH below 7, at least one polymeric organic extrusion, aid, optionally crystallites of a zeolite or zeolite-type material, and optionally supplemental liquid medium, wherein the silica sol contributes to an amount from about 4 wt % to about 40 wt % of the overall silica in the mixture used in step a) excluding the optional zeolite or zeolite-type material; and wherein the polymeric organic extrusion aid is used in an amount from about 0.5 to about 10 parts by weight per 100 parts by weight of the overall silica present in the mixture used in step a);
   b) drying the shaped body obtained in step a); and
   c) heating the shaped body to a temperature ranging from about 500° C. to about 800° C. to form a calcined shaped body.

2. The method of claim 1, wherein the supplemental liquid medium is present and is water.

3. The method of claim 1, wherein the mixture shaped in step as further comprises crystallites of a zeolite or zeolite-type material.

4. The method of claim 3, wherein the zeolite or zeolite-type material is present in an amount that is equal to or lower than the amount of silica in the mixture.

5. The method of claim 1, wherein step c) is carried out in the presence of steam.

6. The method of claim 1, wherein step c) is carried out in the presence of steam and air.

7. The method of claim 1, wherein step c) takes place in an atmosphere containing at least 5 vol % air.

8. The method of claim 7, herein step c) takes place in an atmosphere containing at least 10 vol % steam.

9. The method of claim 7, wherein step c) takes place in an atmosphere containing at least 10 vol % steam.

10. The method of claim 1, wherein the polymeric organic extrusion aid comprises polyvinyl alcohols, cellulose, cellulose ethers, polyoxyethylene, and mixtures of two or more thereof.

11. The method of claim 10, wherein the polymeric organic extrusion aid comprises methylcellulose polymers, hydroxypropyl methyl cellulose polymers, and mixtures thereof.

12. The method of claim 10, wherein the polymeric organic extrusion aid comprises a polyvinyl alcohol.

13. The method of claim 1, wherein shaping is performed by extrusion.

14. The method of claim 1, wherein step b) is carried out at a temperature of about 200° C. or less.

15. The method of claim 1, wherein hating in step c) is carried out for a period of from 10 minutes to 120 minutes.

16. The method of claim 1, wherein the silica sol used contains no detectable traces of sodium.

17. The method of claim 1, wherein the calcined shaped body has a pore volume determined by mercury intrusion porosimetry from 0.8 cm³/g to 1.0 cm³/g, a median pore size from about 220 Å to about 450 Å, and a crush strength of at least 625 g/mm (35 lb/inch).

18. The method of claim 17, wherein the pore volume of the calcined shaped body is from 0.8 cm³/g to 0.95 cm³/g.

19. The method of claim 17, wherein the calcined shaped body has a surface area determined by nitrogen adsorption using the BET equation from 50 m²/g to 150 m²/g.

20. The method of claim 19, further comprising depositing in/on the calcined shaped body at least one catalytically active metal from Groups IVb, IVb, and VIII of the Periodic Table of Elements.

21. The method of claim 20, wherein the catalytically active metal comprises cobalt, molybdenum, and mixtures thereof.

22. The method of claim 17, wherein the calcined shaped body has an alkali metal content of less than 0.5% by weight of the calcined shaped body.

23. The method of claim 1, further comprising depositing in/on the calcined shaped body at least one catalytically active metal from Groups IVb, IVb, and VIII of the Periodic Table of Elements.

24. The method of claim 23, wherein the catalytically active metal comprises cobalt, molybdenum, and mixtures thereof.

* * * * *

UNITED STATES PATENT AND TRADEMARK OFFICE
CERTIFICATE OF CORRECTION

| | |
|---|---|
| PATENT NO. | : 8,207,082 B2 |
| APPLICATION NO. | : 12/087981 |
| DATED | : June 26, 2012 |
| INVENTOR(S) | : Jason Wu et al. |

Page 1 of 1

It is certified that error appears in the above-identified patent and that said Letters Patent is hereby corrected as shown below:

On the Title Page

Add the heading "Related U.S. Application Data" followed by:

(60) Provisional application No. 60/813,296, filed on June 13, 2006, and Provisional application No. 60/759,433, filed on January 17, 2006.

Signed and Sealed this
Twenty-ninth Day of July, 2014

Michelle K. Lee
*Deputy Director of the United States Patent and Trademark Office*